United States Patent

Ogawa

(10) Patent No.: US 8,517,872 B2
(45) Date of Patent: Aug. 27, 2013

(54) ANTI-ROTATION STRUCTURE FOR BALANCE CHAMBER SNAP RING OF BELT TYPE CONTINUOUSLY VARIABLE TRANSMISSION

(75) Inventor: Masato Ogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 655 days.

(21) Appl. No.: 12/720,350

(22) Filed: Mar. 9, 2010

(65) Prior Publication Data

US 2010/0240480 A1 Sep. 23, 2010

(30) Foreign Application Priority Data

Mar. 19, 2009 (JP) ................................. 2009-068412

(51) Int. Cl.
*F16H 9/14* (2006.01)
(52) U.S. Cl.
USPC ............................................................ 474/28
(58) Field of Classification Search
USPC ................................................................ 474/28
See application file for complete search history.

(56) References Cited

U.S. PATENT DOCUMENTS

| | | | | |
|---|---|---|---|---|
| 5,427,578 A * | 6/1995 | Iijima | ............................. | 474/18 |
| 6,152,843 A * | 11/2000 | Murakami | ....................... | 474/28 |
| 6,379,275 B1 * | 4/2002 | Serkh | .............................. | 474/49 |
| 6,565,465 B2 * | 5/2003 | Nishigaya et al. | .............. | 474/28 |
| 7,686,715 B2 * | 3/2010 | Carlson et al. | .................. | 474/28 |
| 8,092,325 B2 * | 1/2012 | Nozawa et al. | ................. | 474/28 |
| 2005/0197221 A1 * | 9/2005 | Nozawa et al. | ................. | 474/18 |

FOREIGN PATENT DOCUMENTS

JP 2001182791 A * 7/2001
JP 2006-275154 10/2006

* cited by examiner

*Primary Examiner* — William E Dondero
*Assistant Examiner* — Michael Riegelman
(74) *Attorney, Agent, or Firm* — Smith, Gambrell & Russell, LLP (57) ABSTRACT

The present invention provides an anti-rotation structure for a balance chamber snap ring of a belt type continuously variable transmission having a balance chamber that balances a centrifugal oil pressure generated in an oil pressure chamber formed on a movable sheave back surface. A projecting portion, which comes into contact with an end portion of the balance chamber snap ring when the balance chamber snap ring rotates independently within a ring groove about a secondary shaft, thereby restricting independent rotation of the balance chamber snap ring, is provided on a latch portion of a cover member. As a result, independent rotation of the balance chamber snap ring can be prevented, thereby preventing the cover member and the balance chamber snap ring from becoming worn.

8 Claims, 5 Drawing Sheets

ANTI-ROTATION STRUCTURE FOR BALANCE CHAMBER SNAP RING OF BELT TYPE CONTINUOUSLY VARIABLE TRANSMISSION

CROSS-REFERENCE TO RELATED APPLICATIONS

The present application claims priority from Japanese Patent Application No. 2009-068412 filed on Mar. 19, 2009, and is hereby incorporated by reference in its entirety.

BACKGROUND OF THE INVENTION

1. Field of the Invention

The present invention relates to a belt type continuously variable transmission, and more particularly to an anti-rotation structure for a balance chamber snap ring of a belt type continuously variable transmission with which axial direction movement of a back surface member forming a back surface of the balance chamber can be prevented.

2. Description of the Related Art

In a belt type continuously variable transmission, a primary pulley and a secondary pulley sandwiching a belt are both constituted by a fixed sheave formed integrally with a pulley shaft and a movable sheave that is free to move in a length direction of the pulley shaft. Thrust is applied to the movable sheave by supplying a required oil pressure to an oil pressure chamber provided on a back surface of the movable sheave, and as a result, the movable sheave sandwiches the belt in cooperation with the fixed sheave such that power transmission is performed in accordance with a frictional force generated at that time. Since the oil pressure chamber is formed on the back surface of the rotating movable sheave, a centrifugal oil pressure is generated in oil (operating oil) contained in the oil pressure chamber. When a sheave thrust generated by the centrifugal oil pressure exceeds a thrust required to ensure that the belt does not slip, belt friction increases unnecessarily.

Therefore, in a conventional belt type continuously variable transmission, a balance chamber (balance oil chamber) is provided on the back surface of the movable sheave oil pressure chamber in order to balance the centrifugal oil pressure (see Japanese Patent Application Publication No. 2006-275154 (paragraph 0016, FIG. 4)).

FIGS. 4A and 4B of Japanese Patent Application Publication No. 2006-275154 show a condition in which axial direction movement of a cover member 27a serving as a back surface member that forms a back surface of a balance chamber (balance oil chamber) 29a is prevented by a balance chamber snap ring that is engaged with a ring groove provided on an inner side of an outer peripheral portion (cylinder 27) of a movable sheave 21b.

Typically, the cover member 27a is held anti-rotationally on the movable sheave 21b by engaging a latch portion (not shown) that projects from an outer peripheral portion of the cover member 27a in a radial direction of a pulley shaft with a recessed portion provided on the inner side of the outer peripheral portion (cylinder 27) of the movable sheave 21b. The balance chamber snap ring (to be referred to hereafter as a snap ring), on the other hand, is not provided with a latch portion such as that provided on the cover member 27a. Instead, the snap ring used for the balance chamber is formed in a C shape, and is fitted into a ring groove under the application of an external force that makes an outer diameter thereof smaller than an inner diameter of the ring groove. Accordingly, the snap ring is pressure-fitted to the ring groove by an elastic force that returns the outer diameter of the snap ring to its original state when the external force is removed.

Incidentally, in the belt type continuously variable transmission described above, the movable sheave presses the belt from both sides while rotating, and therefore external forces are applied to the movable sheave from various directions. Hence, the external forces applied to the movable sheave may cause the snap ring fitted into the ring groove of the movable sheave to deform elastically in a direction of making the outer diameter thereof smaller than the ring groove.

When the snap ring deforms elastically within the ring groove in the direction of making the outer diameter thereof smaller than the ring groove, a pressure fitting force decreases, causing the snap ring to rotate independently about the pulley shaft, and as a result, mutual joining surfaces of the snap ring and the cover member become worn.

SUMMARY OF THE INVENTION

In consideration of the background described above, an object of the present invention is to provide an anti-rotation structure for a balance chamber snap ring of a belt type continuously variable transmission with which the balance chamber snap ring of the belt type continuously variable transmission can be prevented from rotating independently, thereby preventing the snap ring and a back surface member of the balance chamber from becoming worn.

In an anti-rotation structure for a balance chamber snap ring of a belt type continuously variable transmission according to a first aspect of the present invention, the belt type continuously variable transmission includes: a pulley shaft that supports a movable sheave to be free to move in an axial direction; an oil pressure chamber that applies thrust to the movable sheave; a balance chamber that balances a centrifugal oil pressure generated in the oil pressure chamber; a back surface member that forms a back surface of the balance chamber and includes a latch portion provided on an outer peripheral portion thereof so as to latch an inner side of an outer diameter portion of the movable sheave; and a balance chamber snap ring in which a gap is formed between respective end portions thereof when an external force is not applied, and which prevents the back surface member from moving in the axial direction when fitted into a ring groove provided on the inner side of the outer diameter portion of the movable sheave. A constitutional requirement of the anti-rotation structure for a balance chamber snap ring is that the latch portion of the back surface member be provided with a projecting portion that comes into contact with an end portion of the balance chamber snap ring when the balance chamber snap ring rotates independently, thereby restricting the rotation.

In the belt type continuously variable transmission, a primary pulley (drive side pulley) and a secondary pulley (driven side pulley) sandwiching a belt are both constituted by a fixed sheave that is formed integrally with or fixed to a pulley shaft and a movable sheave that is supported to be free to move in a length direction of the pulley shaft. A back surface of the movable sheave is divided into an oil pressure chamber and a balance chamber by a plunger, and by supplying a required oil pressure to the oil pressure chamber, thrust is applied to the movable sheave, enabling power transmission and speed shifting. A centrifugal oil pressure generated in oil (operating oil) contained in the oil pressure chamber when the movable sheave rotates is balanced (canceled out) by supplying oil (operating oil) to the balance chamber.

The oil is supplied to the oil pressure chamber and the balance chamber through individual oil passages provided in the pulley shaft. The reason for this is that the required oil pressure supplied to the oil pressure chamber is different to the required oil pressure supplied to the balance chamber.

The balance chamber is formed by the outer peripheral portion of the movable sheave, the plunger, and the back surface member. The back surface member is held anti-rotationally on the movable sheave by engaging a latch portion that projects from the outer peripheral portion thereof in a radial direction of the pulley shaft with a recessed portion provided on an inner side of an outer peripheral portion of the movable sheave. The balance chamber snap ring contacts the back surface of the back surface member such that movement thereof in the axial direction of the pulley shaft is restricted, and thus the balance chamber snap ring is fixed to the pulley shaft in a retained manner.

A C-shaped internal snap ring is used as the balance chamber snap ring. The balance chamber snap ring is not provided with a latch portion such as that provided on the back surface member, and instead, the balance chamber snap ring is fitted into the ring groove in a condition where an external force that makes an outer diameter thereof smaller than an inner diameter of the ring groove on the inner side of outer peripheral portion of the movable sheave is applied by a dedicated attachment tool such as snap ring pliers, for example. Thus, the balance chamber snap ring is pressure-fitted to the ring groove by an elastic force that returns the outer diameter of the balance chamber snap ring to its original state when the external force is removed.

The back surface member is held anti-rotationally on the inner side of the outer peripheral portion of the movable sheave by the latch portion, while the balance chamber snap ring is pressure-fitted to the ring groove by elastic force. By holding the balance chamber snap ring anti-rotationally on the back surface member, independent rotation of the balance chamber snap ring can be restricted even when an external force is applied in the direction for making the outer diameter of the balance chamber snap ring smaller than the ring groove.

For this purpose, the projecting portion that comes into contact with the end portion of the balance chamber snap ring when the balance chamber snap ring rotates independently, thereby restricting the rotation, is provided on the latch portion of the back surface member, according to a first aspect of the present invention. More specifically, the projecting portion projects from the latch portion toward an axial direction ring groove side of the pulley shaft, and therefore the projecting portion can be contacted by the end portion of the balance chamber snap ring such that independent rotation of the balance chamber snap ring is restricted, according to a second aspect of the present invention. The shape of the surface portion (outer peripheral portion) of the projecting portion that is contacted by the end portion of the balance chamber snap ring may be set as desired in a rectilinear shape, a curved shape, an irregular shape, and so on, as long as independent rotation of the balance chamber snap ring is restricted when the end portion of the balance chamber snap ring comes into contact therewith.

Hence, when an external force is applied to the balance chamber snap ring in a direction for making the outer diameter thereof smaller than the ring groove such that the balance chamber snap ring rotates independently, the end portion of the balance chamber snap ring contacts the projection portion, and as a result, independent rotation of the balance chamber snap ring is restricted.

The projecting portion may be disposed at an interval or without an interval relative to a ring groove bottom portion.

When an interval is not provided between the projecting portion and the ring groove bottom portion, independent rotation of the balance chamber snap ring is restricted by causing the end portion of the balance chamber snap ring to contact the projecting portion.

When an interval is provided between the projecting portion and the ring groove bottom portion, on the other hand, independent rotation of the balance chamber snap ring can be restricted by providing an inclined portion or a curved portion on the end portion of the balance chamber snap ring to push the end portion of the balance chamber snap ring toward the ring groove bottom portion when the end portion of the balance chamber snap ring is inserted between opposing surfaces of the ring groove bottom portion and the projecting portion so as to contact the projecting portion, according to a third aspect of the present invention. Thus, when the end portion of the balance chamber snap ring is inserted between the opposing surfaces of the ring groove bottom portion and the projecting portion such that the inclined portion or curved portion contacts the projecting portion, the end portion of the balance chamber snap ring is pushed toward the ring groove bottom portion, and as a result, a wedging effect is generated. Accordingly, the balance chamber snap ring is prevented from rotating reliably. Moreover, the balance chamber snap ring can be prevented from falling out of the ring groove when an external force for making the outer diameter of the balance chamber snap ring smaller than the ring groove is applied.

By providing the latch portion of the back surface member with the projecting portion that comes into contact with the end portion of the balance chamber snap ring when the balance chamber snap ring rotates independently, thereby restricting independent rotation of the balance chamber snap ring, the cover member and the snap ring can be prevented from becoming worn.

DESCRIPTION OF THE PREFERRED EMBODIMENTS

An embodiment of the present invention will be described below using the drawings.

Figure 1:
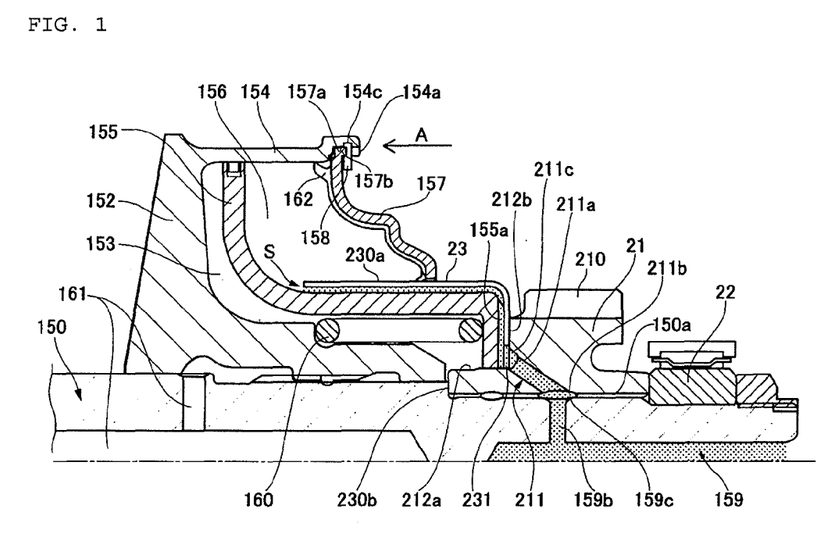
FIG. 1 is a sectional view showing an arrangement of a balance chamber snap ring and a projecting portion formed on a latch portion of a cover member in a belt type continuously variable transmission.

FIG. 1 shows a constitutional example of a belt type continuously variable transmission 1 including: a secondary shaft (pulley shaft) 150 that supports a movable sheave 152 to be free to move in an axial direction; a secondary oil pressure chamber (oil pressure chamber) 153 that applies thrust to the movable sheave 152; a balance chamber 156 that balances a centrifugal oil pressure generated in the secondary oil pressure chamber (oil pressure chamber) 153; a cover member 157 serving as a back surface member that forms a back surface of the balance chamber 156 and includes a latch portion 157a provided on an outer peripheral portion thereof so as to latch an inner side of an outer peripheral portion of the movable sheave 152; and a balance chamber snap ring (to be referred to hereafter as a snap ring) 158 in which a gap is formed between respective end portions thereof when an external force is not applied, and which prevents the cover member 157 from moving in a pulley shaft direction when fitted into a ring groove 154a provided on the inner side of the outer peripheral portion of the movable sheave 152, wherein the latch portion 157a of the cover member 157 is provided with a projecting portion 157b that comes into contact with an end portion 158b of the snap ring 158 when the snap ring 158 rotates independently about the secondary shaft (pulley shaft) 150, thereby restricting independent rotation of the snap ring 158.

Figure 3:
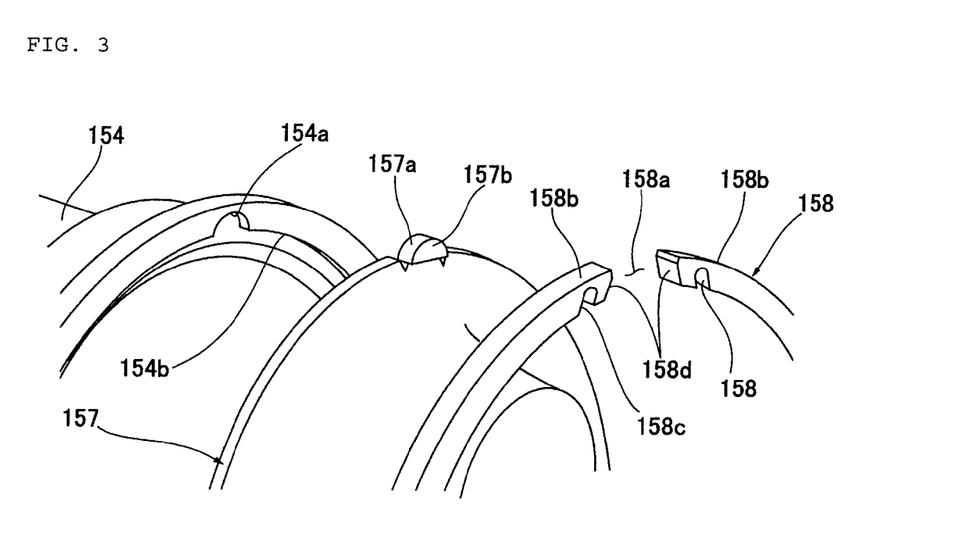
FIG. 3 is an exploded perspective view of a movable sheave, the cover member, and the balance chamber snap ring.

As shown in FIG. 3, a C-shaped internal snap ring is used as the snap ring 158, and respective end portions 158b, 158b thereof on either side of an opening portion 158a are respectively formed with an insertion portion 158c for inserting a pawl of a dedicated attachment tool (snap ring pliers, for example) used to attach and detach the snap ring 158 to and from the ring groove 154a.

Figure 4:
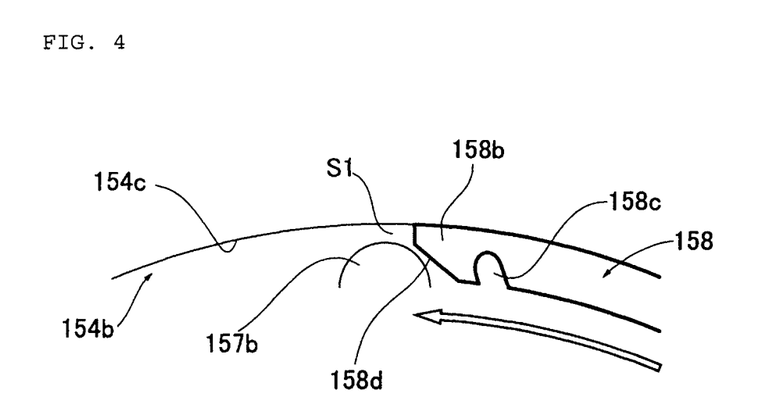
FIG. 4 is a pattern diagram illustrating the manner in which an end portion of the balance chamber snap ring is pushed toward a ring groove bottom portion when the end portion of the balance chamber snap ring is inserted between opposing surfaces of the ring groove bottom portion and the projecting portion so as to contact the projecting portion.
Figure 5:
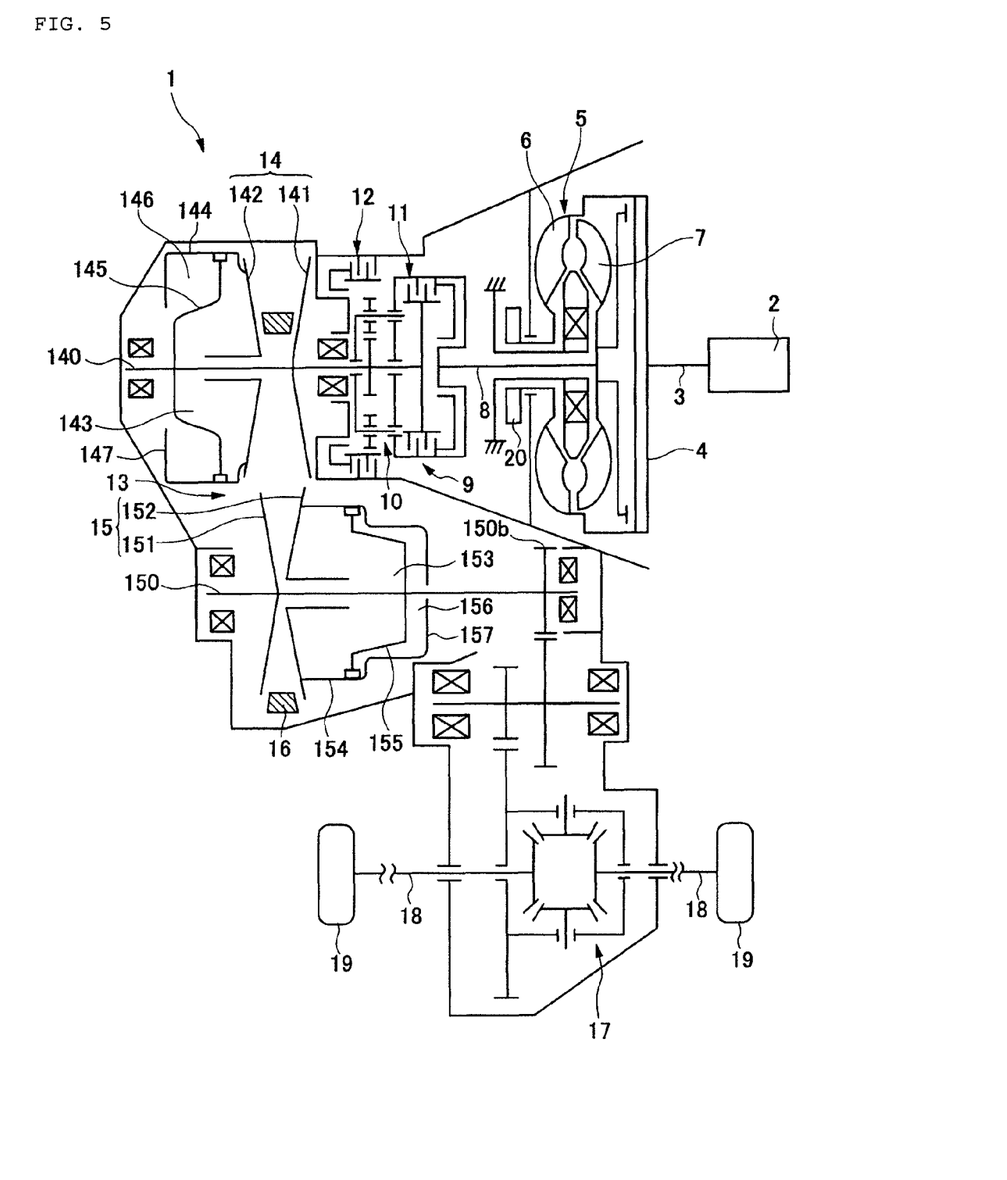
FIG. 5 is an illustrative view illustrating the entire belt type continuously variable transmission.

First, an overall description of the belt type continuously variable transmission 1 will be provided. As shown in FIG. 4, the power of an engine 2 is transmitted from a drive plate 4 connected to a crankshaft 3 to a planetary gear 10 of a forward-reverse switching device 9 via a pump impeller 6 of a torque converter 5, a turbine runner 7 facing the pump impeller 6, and an input shaft 8 connected to the turbine runner 7.

The forward-reverse switching device 9 includes the planetary gear 10, a forward clutch 11, and a reverse brake 12. During forward advancement, the planetary gear 10 is locked by engaging the forward clutch 11 such that power is transmitted to a primary pulley 14 of a shift unit 13 in an input rotation direction without undergoing deceleration. During reversing, the forward clutch 11 is disengaged and the planetary gear 10 is moved differentially by engaging the reverse brake 12. As a result, power is transmitted to the primary pulley 14 of the shift unit 13 after counter-rotating and decelerating the input.

The shift unit 13, which will be described in detail below, includes the primary pulley 14, a secondary pulley 15, and a drive belt 16. The power that is transmitted to the primary pulley 14 is transmitted to the secondary pulley 15 from the drive belt 16. The power that is transmitted to the secondary pulley 15 is transmitted from an output gear 150b of the secondary shaft 150 to a vehicle wheel 19 via a differential device 17 and a drive shaft 18.

The shift unit 13 will now be described. The shift unit 13 includes the primary pulley 14, which is disposed on a primary shaft (input side pulley shaft) 140, the secondary pulley 15, which is disposed opposite the primary pulley 14 on the secondary shaft (output side pulley shaft) 150, and the drive belt 16, which is wound around the primary pulley 14 and the secondary pulley 15.

The primary pulley 14 includes a fixed sheave 141 fixed to the primary shaft 140, and a movable sheave 142 disposed opposite the fixed sheave 141 to be free to move in a length direction of the primary shaft 140. A primary oil pressure chamber (also referred to simply as an oil pressure chamber) 143 for applying thrust to the movable sheave 142 is formed on a back surface of the movable sheave 142 by an outer peripheral portion 144 of the movable sheave 142 and a plunger 145 that contacts the outer peripheral portion 144. Further, a balance chamber 146 for balancing a centrifugal oil pressure generated in the primary oil pressure chamber 143 is formed on a back surface side of the primary oil pressure chamber 143 by the outer peripheral portion 144 of the movable sheave 142 and a cover member 147 fixed to the outer peripheral portion 144. In other words, the primary oil pressure chamber 143 and the balance chamber 146 are defined by the plunger 145.

The secondary pulley 15 includes a fixed sheave 151 fixed to the secondary shaft 150, and the movable sheave 152, which is disposed opposite the fixed sheave 151 to be free to move in a length direction of the secondary shaft 150. The secondary oil pressure chamber (also referred to simply as an oil pressure chamber) 153 for applying thrust to the movable sheave 152 is formed on a back surface of the movable sheave 152 by an outer peripheral portion 154 of the movable sheave 152 and a plunger 155 that contacts the outer peripheral portion 154. Further, the balance chamber 156 for balancing the centrifugal oil pressure generated in the secondary oil pressure chamber 153 is formed on a back surface side of the secondary oil pressure chamber 153 by the outer peripheral portion 154 of the movable sheave 152 and the cover member 157, which is fixed to the outer peripheral portion 154. In other words, the secondary oil pressure chamber 153 and the balance chamber 156 are defined by the plunger 155.

A line pressure obtained by regulating a discharge pressure of an oil pump 20 driven by the engine 2 is supplied to the secondary oil pressure chamber 153 through an oil passage 161 (shown in FIG. 1) provided around a rotary axis of the secondary pulley shaft 150. Further, a primary pressure obtained by reducing the line pressure is supplied to the primary oil pressure chamber 143 through an oil passage (not shown) provided in the primary pulley shaft 140. When working oil pressure is supplied to the oil pressure chamber 143, thrust causes the movable sheave 142 to sandwich the drive belt 16 together with the fixed sheave 141. Further, when working oil pressure is supplied to the oil pressure chamber 153, thrust causes the movable sheave 152 to sandwich the drive belt 16 together with the fixed sheave 151. A frictional force generated at this time causes power to be transmitted between the primary pulley 14 and secondary pulley 15, and by variably setting respective pulley grooves thereof, gear ratio control is performed.

The line pressure and primary pressure are controlled by an oil pressure control device (not shown). The oil pressure control device sets a target control value of the gear ratio using map data in which an optimum shift pattern is stored in advance and values such as a vehicle speed, a throttle opening, and a secondary pulley rotation speed, and controls the primary pressure on the basis of a deviation between the target control value of the gear ratio and an actual gear ratio calculated from an actual primary pulley rotation speed and an actual secondary pulley rotation speed. Further, the oil pressure control device sets a target control value of a line pressure required for torque transmission by the drive belt 16 on the basis of the gear ratio and an engine torque, and regulates the discharge pressure of the oil pump 20 on the basis of a deviation between the target line pressure and an actual line pressure detected using a sensor.

Furthermore, the oil pressure control device supplies working oil to the balance chambers 146, 156 to balance a centrifugal oil pressure that is generated in the oil in the primary oil pressure chamber 143 and the oil in the secondary oil pressure chamber 153 when the primary pulley 14 and secondary pulley 15 rotate. An oil supply circuit for supplying oil to the balance chamber 156 on the back surface side of the movable sheave 152 of the secondary pulley 15 will now be described.

As shown in FIG. 1, an oil passage 159 of the secondary shaft (pulley shaft) 150 for supplying oil to the balance chamber 156 includes a main oil passage portion 159a formed around a central rotary axis of the secondary shaft 150, an oil hole portion 159b that extends in a radial direction from the main oil passage portion 159a to an outer peripheral portion, and an entire circumference groove 159c provided in the outer peripheral portion to which the oil hole portion 159b extends.

A rotary member 21 is spline-fitted to a spline groove portion 150a provided in the outer peripheral portion of the secondary shaft 150. Respective length direction ends of the rotary member 21 are sandwiched between a step portion 150b of the secondary shaft 150 and a bearing 22 fixed in a retained manner to the secondary shaft 150, and thus the rotary member 21 is fixed in a retained manner to the secondary shaft 150. An outer peripheral portion of the rotary member 21 is formed in a projecting shape, and tooth portions 210 are formed integrally around the entire circumference of a central portion thereof. Thus, the rotary member 21 can be used as a substitute for the output gear 150b to transmit driving force from the secondary shaft 150 to the differential device 17.

The rotary member 21 includes an oil passage 211 that communicates with the entire circumference groove 159c of the secondary shaft 150 and supplies (supplies and discharges) oil discharged from the oil passage 159 of the secondary shaft 150 from an inner peripheral portion to the outer peripheral portion of the rotary member 21. The oil passage 211 includes an oil hole portion 211a that extends from the inner peripheral portion to the outer peripheral portion of the rotary member 21, and entire circumference groove portions 211b, 211c formed respectively in respective end portions of the oil hole portion 211a. The entire circumference groove portion 211b of the inner peripheral portion communicates with the entire circumference groove portion 159a of the secondary shaft 150, while the entire circumference groove portion 211c of the outer peripheral portion communicates with an oil passage 231 provided in a guide member 23.

The guide member 23 is formed such that an inner peripheral portion thereof is fixed to movable sheave side outer peripheral portions 212a, 212b of the rotary member 21 together with the plunger 155, while an outer peripheral portion 230a thereof is disposed at an interval S from the plunger 155. An intermediate portion 230b extending from the inner peripheral portion to the outer peripheral portion 230a of the guide member 23 extends in a radial direction of the rotary member 21. Further, the outer peripheral portion 230a extends in the length direction of the secondary shaft 150 such that a tip end portion (open end portion) thereof extends to the interior of the balance chamber 156. Furthermore, an inner peripheral portion of the cover member 157 contacts the outer peripheral portion 230a of the guide member 23 to be capable of sliding thereon.

The guide member 23 includes the oil passage 231 that communicates with the entire circumference groove 211c of the rotary member 21 and supplies oil discharged from the rotary member 21 to the inner peripheral portion of the balance chamber 156. The oil passage 231 is a notch oil passage portion formed by a notch. Multiple oil passages 231 are formed at equal intervals around the inner peripheral portion of the guide member 23.

By fixing the inner peripheral portion of the guide member 23 to the outer peripheral portions 212a, 212b of the rotary member 21 together with the plunger 155, the plunger 155, rotary member 21, and guide member 23 are integrated. In the integrated plunger 155 and guide member 23, the interval S oriented in the radial direction of the secondary shaft (pulley shaft) 150 is formed between the outer peripheral portion 230a of the guide member 23 and the plunger 155. The interval S allows oil to be supplied (supplied and discharged) to the balance chamber 156 between opposing surfaces of the plunger 155 and the outer peripheral portion 230a of the guide member 23.

The plunger 155 includes an oil passage 155a that communicates with the oil passage 231 of the guide member 23 and supplies oil discharged from the guide member 23 into the aforementioned interval S between the outer peripheral portion 230a of the guide member 23 and the balance chamber 156. The oil passage 155a is a groove-shaped oil passage (oil groove). Multiple oil passages 155a are formed at equal intervals in a radial direction from an inner peripheral portion of the plunger 155. Note that in the secondary oil pressure chamber 153, a spring 160 for applying initial thrust to the movable sheave 152 is disposed between the plunger 155 and the back surface side of the movable sheave 152.

Oil passage widths of the oil passage 231 of the guide member 23 and the oil passage 155a of the plunger 155 are set such that at least one set of the oil passage 231 of the guide member 23 and the oil passage 155a of the plunger 155 are in phase, thereby ensuring that the oil passage (oil supply circuit) does not become blocked. Thus, when the rotary member 21, guide member 23 and plunger 155 are fixed to the secondary shaft 150, the respective members do not have to be positioned relative to each other, and an oil passage extending from the oil passage 159 of the secondary shaft 150 to the balance chamber 156 is thus established.

Note that an oil supply circuit for supplying oil to the balance chamber 146 on the back surface side of the movable sheave 142 of the primary pulley 14 is formed similarly.

Hence, an oil passage (the oil hole portion 211a, the entire circumference groove 211b, the entire circumference groove 211c, the oil passage 231, and the oil passage 155a) that communicates with the oil passage 159 of the secondary shaft 150 and supplies oil between the opposing surfaces of the plunger 155 and the outer peripheral portion 230a of the guide member 23 is provided in the plunger 155, the rotary member 21, and the guide member 23, and as a result, oil can be supplied to the balance chamber 156.

An anti-rotation structure for a snap ring will now be described. Note that an anti-rotation structure for a balance chamber snap ring provided on the secondary pulley 15 side will be described below. However, this structure can also be applied to the primary pulley 14 side.

Figure 2:
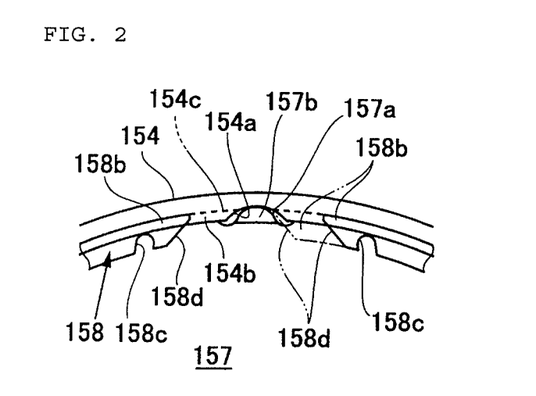
FIG. 2 is a view seen from an arrow A in FIG. 1A.

As shown in FIGS. 1 to 3, the cover member 157 is prevented from rotating by latching the latch portion 157a, which projects in a radial direction from the outer peripheral portion thereof, to the latched portion 154a formed as a recess on the inner side of the outer peripheral portion 154 of the movable sheave 152. The snap ring 158 is disposed on the back surface of the cover member 157, and a sealing material 162 (shown in FIG. 1) is disposed on a front surface (the balance chamber 156 side) thereof.

The snap ring 158 is fitted into the ring groove 154 in a condition where an external force for making an outer diameter thereof smaller than an inner diameter of the ring groove 154 is applied by a dedicated attachment tool such as snap ring pliers, for example, and the latch portion 157a is positioned in the opening portion 158a of the snap ring 158 (i.e. between the end portions 158b, 158b). Thus, the snap ring 158 is pressure-fitted to the ring groove 154b by an elastic force that returns the outer diameter of the snap ring 158 to its original state when the external force is removed. The front surface of the snap ring 158 pressure-fitted to the ring groove 154b is pressed against a back surface outer peripheral portion of the cover member 157, and therefore the cover member 157 is fixed to the movable sheave 152 in a retained manner such that axial movement thereof is restricted.

As described above, the cover member 157 is prevented from rotating by latching the latch portion 157a to the latched portion 154a on the inner side of the outer peripheral portion 154 of the movable sheave 152, while the snap ring 158 is pressure-fitted to the ring groove 154b by elastic force. By holding the snap ring 158 anti-rotationally on the cover member 157, independent rotation of the snap ring 158 is restricted even when an external force is applied in a direction for making the outer diameter of the snap ring 158 smaller than the ring groove 154b.

For this purpose, the projecting portion 157b that comes into contact with the end portion 158b of the snap ring 158 when the snap ring 158 rotates independently about the secondary shaft (pulley shaft) 150 (in this case, the rotation direction may be either a forward direction or a reverse direction relative to the rotation direction of the movable sheave 152), thereby restricting independent rotation of the snap ring 158, is provided on the latch portion 157a of the cover member 157.

The projecting portion 157b projects from the latch portion 157a toward an axial direction ring groove side of the secondary shaft (pulley shaft) 150 (the back surface side of the movable sheave 152) such that the end portion 158b of the snap ring 158 can contact the projecting portion 157b when it starts to rotate independently. Hence, the projecting portion 157b restricts rotation of the snap ring 158 such that when the end portion 158b of the snap ring 158 contacts the projecting portion 157b after beginning to rotate independently, the snap ring 158 cannot rotate further.

As shown in FIGS. 2 and 4, the back surface shape of the projecting portion 157b is substantially identical to the back surface shape of the latch portion 157a. However, the back surface shape of the projecting portion 157b, the amount by which it projects to the ring groove side (i.e. the thickness), and so on may be set as desired as long as the projecting portion 157b restricts rotation of the snap ring 158 when contacted by the end portion 158b of the snap ring 158. Further, a joint portion between the end portion 158b of the snap ring 158 and the projecting portion 157b may be provided with a recess/projection portion for mutual engagement.

Furthermore, the projecting portion 157b may be formed without an interval from a bottom portion 154c of the ring groove 154b (see FIG. 2) or with an interval S1 (see FIG. 4).

As shown in FIG. 2, in a case where an interval is not provided between the projecting portion 157b and the bottom portion 154c of the ring groove 154b, or in other words a case where the projecting portion 157b contacts the bottom portion 154c of the ring groove 154b, the end portion 158b of the snap ring 158 contacts the projecting portion 157b when an external force is applied in a direction for making the outer diameter of the snap ring 158 smaller than the ring groove 154b such that the snap ring 158 begins to rotate independently, and as a result, independent rotation of the snap ring 158 is restricted. In this case, an inclined portion (or a curved portion) 158d that is inclined (or curved) such that a gap between inner diameter side end portions is larger than a gap between outer diameter side end portions, as will be described below, may be provided on the end portion 158b of the snap ring 158 as desired. When the inclined portion (or curved portion) 158d is provided, a wedging effect (to be described below) is obtained.

On the other hand, when the interval S1 is provided between the projecting portion 157b and the bottom portion 154c of the ring groove 154b, as shown in FIG. 4, the inclined portion (or curved portion) 158d is provided on an inner peripheral side of the end portion 158b of the snap ring 158 to push the end portion 158b of the snap ring 158 toward the bottom portion 154c of the ring groove 154b when the end portion 158b of the snap ring 158 is inserted between opposing surfaces of the projecting portion 157b and the bottom portion 154c of the ring groove 154b (i.e. into the interval S1) such that the end portion 158b of the snap ring 158 contacts the projecting portion 157b. The inclined portion (or curved portion) 158d is inclined (or curved) such that in the end portion 158b of the snap ring 158, the gap between the inner diameter side end portions is larger than the gap between the outer diameter side end portions.

Hence, when the end portion 158b of the snap ring 158 is inserted between the opposing surfaces of the projecting portion 157b and the bottom portion 154c of the ring groove 154b such that the inclined portion (or curved portion) 158d thereof contacts the projecting portion 157b, the end portion 158b is pushed toward the bottom portion 154c of the ring groove 154b, thereby generating a wedging effect. As a result of this wedging effect, rotation of the snap ring 158 can be prevented reliably, and therefore the snap ring 158 can be prevented from falling out of the ring groove 154b even when an external force for making the outer diameter of the snap ring 158 smaller than the ring groove 154b is applied.

Note that when the interval S1 is provided between the projecting portion 157b and the bottom portion 154c of the ring groove 154b, the inclined portion (or curved portion) 158d may be omitted from the end portion 158b of the snap ring 158. In this case, when the snap ring 158 begins to rotate independently, the end portion 158b of the snap ring 158 contacts the projecting portion 157b, and as a result, independent rotation of the snap ring 158 is restricted.

What is claimed is:

1. A belt type continuously variable transmission comprising:
    a pulley shaft that supports a movable sheave to be free to move in an axial direction;
    an oil pressure chamber that applies thrust to said movable sheave;
    a balance chamber that balances a centrifugal oil pressure generated in said oil pressure chamber;
    a back surface member that forms a back surface of said balance chamber and includes a latch portion provided on an outer peripheral portion thereof so as to latch an inner side of an outer diameter portion of said movable sheave; and
    a balance chamber snap ring in which a gap is formed between respective end portions thereof when an external force is not applied, and which prevents said back surface member from moving in said axial direction when fitted into a ring groove provided on said inner side of said outer diameter portion of said movable sheave,
    wherein said latch portion comprises a projecting portion that projects in a semi-cylindrical shape toward an axial direction ring groove side of said pulley shaft and contacts with one of said end portions of said balance chamber snap ring when said balance chamber snap ring rotates independently about said pulley shaft, so as to restrict independent rotation of said balance chamber snap ring.

2. The belt type continuously variable transmission according to claim 1, wherein in said anti-rotation structure for a balance chamber snap ring said one of said end portions of said balance chamber snap ring is provided with an inclined portion or a curved portion that pushes said one of said end portions of said balance chamber snap ring toward a bottom portion of said ring groove when said one of said end portions of said balance chamber snap ring contacts said projecting portion.

3. The belt type continuously variable transmission according to claim 1, wherein said one of said end portions of said balance chamber snap ring is provided with an inclined portion or a curved portion that pushes said one of said end portions of said balance chamber snap ring toward a bottom portion of said ring groove when said one of said end portions of said balance chamber snap ring contacts with an outer periphery of said projecting portion.

4. A belt type continuously variable transmission comprising:
   a pulley shaft that supports a movable sheave to be free to move in an axial direction;
   an oil pressure chamber that applies thrust to said movable sheave;
   a balance chamber that balances a centrifugal oil pressure generated in said oil pressure chamber;
   a back surface member that forms a back surface of said balance chamber and includes a latch portion provided on an outer peripheral portion thereof so as to latch an inner side of an outer diameter portion of said movable sheave; and
   a balance chamber snap ring in which a gap is formed between respective end portions thereof when an external force is not applied, and which prevents said back surface member from moving in said axial direction when fitted into a ring groove provided on said inner side of said outer diameter portion of said movable sheave,
   wherein said latch portion comprises a projecting portion that contacts with one of said end portions of said balance chamber snap ring, when said balance chamber snap ring rotates independently about said pulley shaft, so as to restrict independent rotation of said balance chamber snap ring, and wherein the projecting portion and said one of said end portions have respective contact surfaces that form a wedge arrangement between said one of said end portions and said projecting portion when rotation of the snap ring is restricted.

5. The belt type continuously variable transmission according to claim 4 wherein there is a spacing gap defined between a radial outermost portion of said projecting portion and a bottom portion of said ring groove.

6. The belt type continuously variable transmission according to claim 4 wherein said respective contact surfaces include a curved surface on said projecting portion.

7. A belt type continuously variable transmission according to claim 6 wherein said projecting portion is in a semi-cylindrical shape with a portion of said semi-cylindrical shape defining said curved surface on said projecting portion.

8. The belt type continuously variable transmission according to claim 6 wherein said one of said end portions has a tapering free end that is configured to contact said curved surface and define said wedge arrangement when rotation of the snap ring is restricted.

* * * * *